United States Patent [19]
Sekiguchi et al.

[11] 3,877,759
[45] Apr. 15, 1975

[54] VEHICLE ANTI-SKID DEVICE

[75] Inventors: Tomoyoshi Sekiguchi, Yokohama; Yasuhisa Takeuchi, Yokosuka, both of Japan

[73] Assignees: Nissan Motor Company, Limited, Yokohama; Atsugi Motor Parts Company, Limited, Atsugi, both of Japan

[22] Filed: Dec. 20, 1973

[21] Appl. No.: 426,537

[30] Foreign Application Priority Data
Dec. 23, 1972 Japan.................................. 48-2052

[52] U.S. Cl...................... 303/21 F; 303/10; 303/63
[51] Int. Cl.............................................. B60t 8/06
[58] Field of Search .. 188/181 A; 303/21 C, 21 CE, 303/21 CF, 21 CG, 21 F, 21 FM, 21 FP, 303/21 SV, 10, 63

[56] References Cited
UNITED STATES PATENTS

| | | | |
|---|---|---|---|
| 3,514,161 | 5/1970 | Frayer | 303/21 SV |
| 3,672,731 | 6/1972 | Koivunen | 303/21 FM |
| 3,747,990 | 7/1973 | Tanguy | 303/21 FM |

*Primary Examiner*—Duane A. Reger

[57] ABSTRACT

A vehicle brake cylinder is normally hydraulically actuable from a manually operated master cylinder through a modulator valve and a bypass valve. When a skid condition such as excessive wheel deceleration is sensed, the modulator valve is closed and drains some fluid from the brake cylinder to reduce the braking force applied to the vehicle wheels. If a pump used to supply actuating fluid to the modulator valve fails, the modulator valve is bypassed and the brake cylinder is actuable from the master cylinder through the bypass valve only.

6 Claims, 4 Drawing Figures

VEHICLE ANTI-SKID DEVICE

This invention relates to an anti-skid device for a braking system of an automotive vehicle.

Conventional anti-skid brake control devices used in automotive vehicles usually have a hydraulic modulator valve which is designed to reduce the pressure of hydraulic fluid supplied to the brake cylinders when the deceleration of a wheel reaches a predetermined value, to prevent locking of the wheels and skidding of the vehicle. These prior art devices, however, are complicated and expensive in construction and do not operate effectively to prevent vehicle skidding.

It is therefore an object of the present invention to provide an anti-skid device for an automotive vehicle which is simple in construction and small in size.

Another object of the present invention is to provide an anti-skid device which can effectively prevent skidding of an automotive vehicle due to locked wheels.

Another object of the present invention is to provide an anti-skid brake control device which can provide braking force even a pump forming part of the braking system fails.

These and other objects, features and advantages of the present invention will become more apparent from the following description when taken in conjunction with the accompanying drawings, in which.

Figure 1:
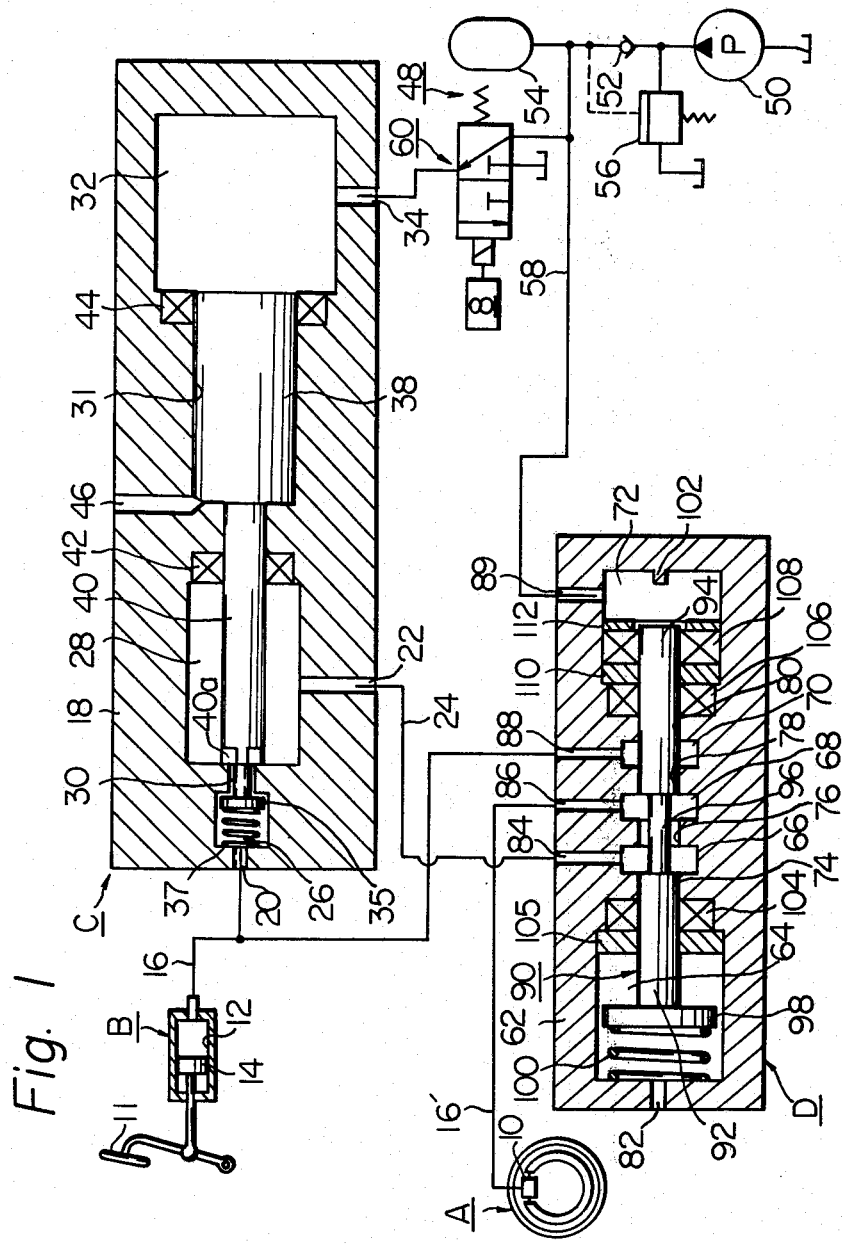
FIG. 1 is a sectional view of a preferred embodiment of an anti-skid brake control device according to the present invention.

Referring now to the drawings and more particularly to FIG. 1, there is shown a preferred embodiment of an anti-skid brake control device according to the present invention incorporated in a braking system of a vehicle having brake assemblies A, only one of which is shown, each having a brake cylinder 10 which is supplied with hydraulic brake fluid under pressure from a conventional manually actuable master cylinder B. The master cylinder B is actuated by a brake pedal 11, and includes a fluid chamber 12 from which fluid is displaced by means of a conventional hydraulic piston 14 into a hydraulic line 16 leading to the brake cylinders 10 through a hydraulic modulator valve C and a bypass valve D.

The hydraulic modulator valve C includes a casing 18 having an inlet 20 communicating through the hydraulic line 16 with the master cylinder B, and an outlet 22 communicating through a hydraulic line 24 with the bypass valve D. The casing 18 has also formed therein first and second hydraulic brake pressure chambers 26 and 28 which are axially aligned with each other and are communicable with each other through an axial passageway 30 formed in the casing 18 therebetween. The first hydraulic brake pressure chamber 26 communicates with the inlet 20, while the second hydraulic brake pressure chamber 28 communicates with the outlet 22. The casing 18 is further formed with a piston chamber 31 and a working chamber 32 which communicates through a port 34 with a power unit which will be subseqently described in detail.

As shown, a shut-off valve 35 is disposed in the passageway 30 to selectively allow or block fluid communication therethrough. The valve 35 is biased by a compression spring 37 disposed in the first hydraulic brake pressure chamber 26 toward a position to block the fluid passageway 30. The valve 35 has a stem (not numbered) which extends through the passageway 30 toward the second hydraulic brake pressure chamber 28. A piston 38 is slidably disposed in the piston chamber 31 and exposed at one end to fluid under pressure in the working chamber 32. This piston 38 has a plunger portion 40 extending into the second hydraulic brake pressure chamber 28. The plunger portion 40 is formed at its terminal end with at least one slot 40a to allow fluid flow into the second hydraulic pressure chamber 28 from the axial passageway 30. As shown, the end of the plunger portion 40 is in abutting engagement with the stem of the shut-off valve 35. Indicated as 42 and 44 are seals which prevent oil leakage from the chambers 28 and 32, respectively. Indicated as 46 is an air vent which facilitates smooth movement of the piston 38 within the piston chamber 31. As already noted, the piston 38 is exposed at one end to fluid under pressure in the working chamber 32, into which fluid is fed from the power unit.

The power unit or source of fluid under pressure, which is generally designated by a reference numeral 48, includes a pump 50, which is hydraulically connected through a check valve 52 to an accumulator 54, which maintains a supply of fluid under high pressure using a suitable compressed gas chamber, even when the pump 50 is not operating. A suitable regulator valve 56 is used to unload the pump 50 whenever the pressure in the accumulator 54 exceeds a predetermined upper limit, and causes the pump 50 to charge the accumulator 54 whenever the pressure in the accumulator 54 drops below the predetermined limit. Fluid under pressure from the accumulator 54 is continuously fed through a fluid line 58 and the opening 34 into the working chamber 32 through a control valve 60. The control valve 60 is electrically controlled by a sensor 8, which senses a selected vehicle operating parameter such as the angular deceleration of a vehicle wheel (not shown), and generates an electrical skid signal when the level of the parameter is above a predetermined value indicating a skid condition of the vehicle.

If the skid signal is not received by the control valve 60, the control valve 60 will be open, and fluid may flow therethrough from the power unit 48 into the working chamber 32. If the skid signal is received, the control valve 60 will close, and connect the working chamber 32 to a fluid reservoir (not shown) under substantially atmospheric pressure. Fluid under pressure from the source 48 is also supplied through the fluid line 58 to the bypass valve D.

The bypass valve D comprises a casing 62 which has formed therein first, second, third, fourth and fifth chambers 64, 66, 68, 70 and 72 which are axially aligned with each other. The casing 62 also has bores 74, 76, 78 and 80 sequentially axially formed between the first to fifth chambers 64 to 72. The first chamber 64 has an air vent 82 communicating with the atmosphere. The second chamber 66 communicates through a second inlet 84 and the line 24 with the outlet 22 of the modulator valve C. The third chamber 68 communicates through an outlet 86 and a hydraulic line 16' with the brake cylinders 10. The fourth chamber 70 communicates through a first inlet 88 and the line 16 with the master cylinder B. The fifth chamber 72 communicates through a third inlet 89 and the line 58 with the power unit or source 48.

In order to cause the outlet 86 to selectively communicate with the first inlet 88 or the second inlet 84, a valve spool 90 is slidably disposed in the bores 74, 76, 78 and 80. The valve spool 90 has first and second large diameter portions 92 and 94 extending into the first and fifth chambers 64 and 72, respectively, and an intermediate small diameter portion 96 formed between the first and second large diameter portions 92 and 94. The first large diameter portion 92 has at one end a spool head 98 integrally formed therewith which is axially slidable within the first chamber 64. A biasing means such as compression spring 100 is disposed in the first chamber 64 to urge the valve spool 90 rightward as shown to establish fluid communication between the first inlet 88 and the outlet 86. The second large diameter portion 94 has one end exposed to fluid under pressure supplied into the fifth chamber 72 through the fluid line 58 from the power unit 48. Thus, when fluid under pressure is supplied into the fifth chamber 72, the valve spool 90 is moved leftward as shown to establish fluid communication between the second inlet 84 and the outlet 86 by the force developed by fluid pressure acting on the end face of the valve spool 90. As shown, the fifth chamber 72 is formed with a stop 103 which prevents excessive rightward axial movement of the valve spool 90. To prevent oil leakage from the second chamber 66 into the first chamber 64, a seal 104 is provided which is supported by a retainer 105 disposed in the first chamber 64. Likewise, seals 106 and 108 are provided which are supported by retainers 110 and 112, respectively, which are disposed in the fifth chamber 72.

During normal operation of the vehicle, when the angular deceleration of the wheel is below the predetermined value, the power unit 48 supplies fluid under pressure into the working chamber 32 of the modulator valve C through the control valve 60. The pressure of fluid in the working chamber 32 acts on the end face of the piston 38, thereby moving the piston 38 to the piston shown in FIG. 1. In this situation, the end of the plunger 40 abuts with the end of the stem of the shut-off valve 35 so that the valve 35 is moved leftward against the force of the spring 37 to assume the position shown in FIG. 1. Thus, hydralic brake fluid under pressure supplied into the first chamber 26 flows through the passageway 30 into the second chamber 28. Hydraulic brake fluid under pressure from the second chamber 28 is then fed through the outlet 22 and the hydraulic line 24 into the second inlet 84 of the casing 62. In FIG. 1, the plunger portion 40 of the piston 38 is in a position of maximum extension into the second chamber 28. Also, fluid under pressure is fed from the power unit 48 through the fluid line 58 and the third inlet 89 into the fifth chamber 72 of the bypass valve D. Fluid under pressure then acts on the end face of the second large diameter portion 94 of the valve spool 90 to move the valve spool 90 leftward against the force of the compression spring 100 to assume the position shown in FIG. 1. Under these circumstances, the outlet 86 is brought into fluid communication with the second inlet 84 into which hydraulic brake fluid under pressure is fed from the modulator valve C. Accordingly, hydraulic brake fluid under pressure from the outlet 86 is fed through the hydraulic line 16' into the brake cylinger 10.

When the angular deceleration of the wheel exceeds the predetermined value, the control valve 60 closes to drain fluid from the working chamber 32 in response to the skid signal from the sensor 8. Accordingly, the piston 38 is moved rightward as shown by the force of the compression spring 37 until the shut-off valve 35 blocks the axial passageway 30.

The plunger portion 40 of the piston 38 thus moves to a position of minimum extension into the second chamber 28, thereby reducing the effective volume of the second chamber 28. This action partially drains fluid from the brake cylinders 10 through the line 16', the outlet 86 and second inlet 84 of the bypass valve D, the line 24 and the outlet 22 of the modulator valve C into the second chamber 28 of the modulator valve C. This reduces the braking force applied by the brake cylinders 10 to the brake assemblies to eliminate the skid condition of the vehicle by preventing locking of the wheels. When the angular deceleration of the wheel drops below the predetermined value, the sensor 8 terminates generation of the skid signal, and the control valve 60 opens to feed fluid under pressure into the working chamber 32 of the modulator valve C. Thus, hydraulic brake fluid under pressure from the master cylinder B is fed into the wheel cylinders 10 as previously described. Skidding of the vehicle is in this manner prevented.

If the pressure of fluid supplied from the power unit or source 48 should drop below a predetermined level indicating failure of the source 48, fluid is drained from the working chamber 32 of the modulator valve C and the fifth chamber 72 of the bypass valve D, and the piston 38 is moved rightward by the force of the compression spring 37 and the shut-off valve 35 will block the axial passageway 30. At the same time, the valve spool 90 of the bypass valve D is moved rightward by the force of the compression spring 100 so that the outlet 86 is brought into fluid communication with the first inlet 88 which is in communication with the master cylinder B through the hydraulic line 16. Thus, hydraulic brake fluid under pressure from the master cylinder B is supplied into the wheel cylinders 10 through a bypass flow path around the modulator valve C, and braking force is available for the wheels even if the power unit 48 fails.

Figure 2:
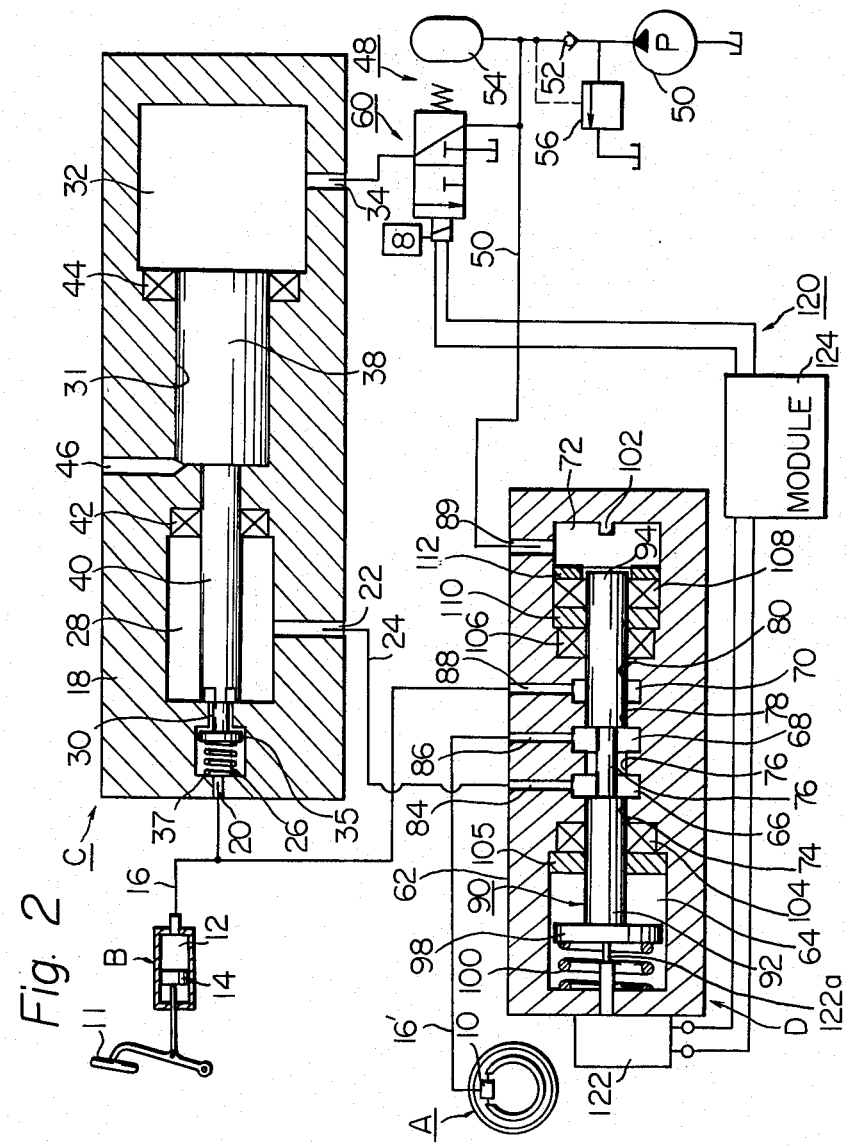
FIG. 2 is a view similar to FIG. 1 but shows a modified form of the device shown in FIG. 1.

A modified form of the anit-skid control device shown in FIG. 1 is illustrated in FIG. 2, in which like or corresponding component parts are designated by the same reference numerals as those used in FIG. 1. In this modification, the anti-skid brake control device further comprises an emergency control device which is generally indicated as 120. The emergency control device 120 includes an electrical switch such as a mechanical switch 122 mounted on the casing 62. The mechanical switch 122 has a movable rod 122a which moves rightward to cause its own switch contacts to open or close when the valve spool 90 is moved rightward by the force of the compression spring 100. The mechanical switch 122 is electrically connected through a module 124 to the control valve 60. With this arrangement, if the power unit 48 fails, no fluid under pressure is supplied into the fifth chamber 72 of the bypass valve D as previously mentioned, and the valve spool 90 is moved rightward to provide fluid communication between the first inlet 88 and the outlet 86. In this condition, the movable rod 122a of the mechanical switch 122 disengages from the spool head 98 of the valve spool 90 and generates an electrical actuation signal which is fed to the module 124. Upon receiving this electrical actuation signal, the module 124 actuates the control valve 60 to assume another closed condition in which fluid under pressure in the working chamber 32 is contained therein. Accordingly, the piston 38 is held in its leftmost position as shown in FIG. 2, and the shut-off valve 35 continues to open the passageway 30. Thus, the second chamber 28 is filled with hydraulic brake fluid under pressure and, when the brake pedal is depressed, no fluid under pressure will drain through the passageway 30 into the second chamber 28 and effective braking force is available even when it is now to be noted that the mechanical switch 122 may be replaced by various switch means for detecting decrease of pressue in the chamber 72 although the mechanical switch 122 is so provided as to cooperate with the valve spool 90 in the embodiment mentioned above the power unit 48 fails.

Figure 3:
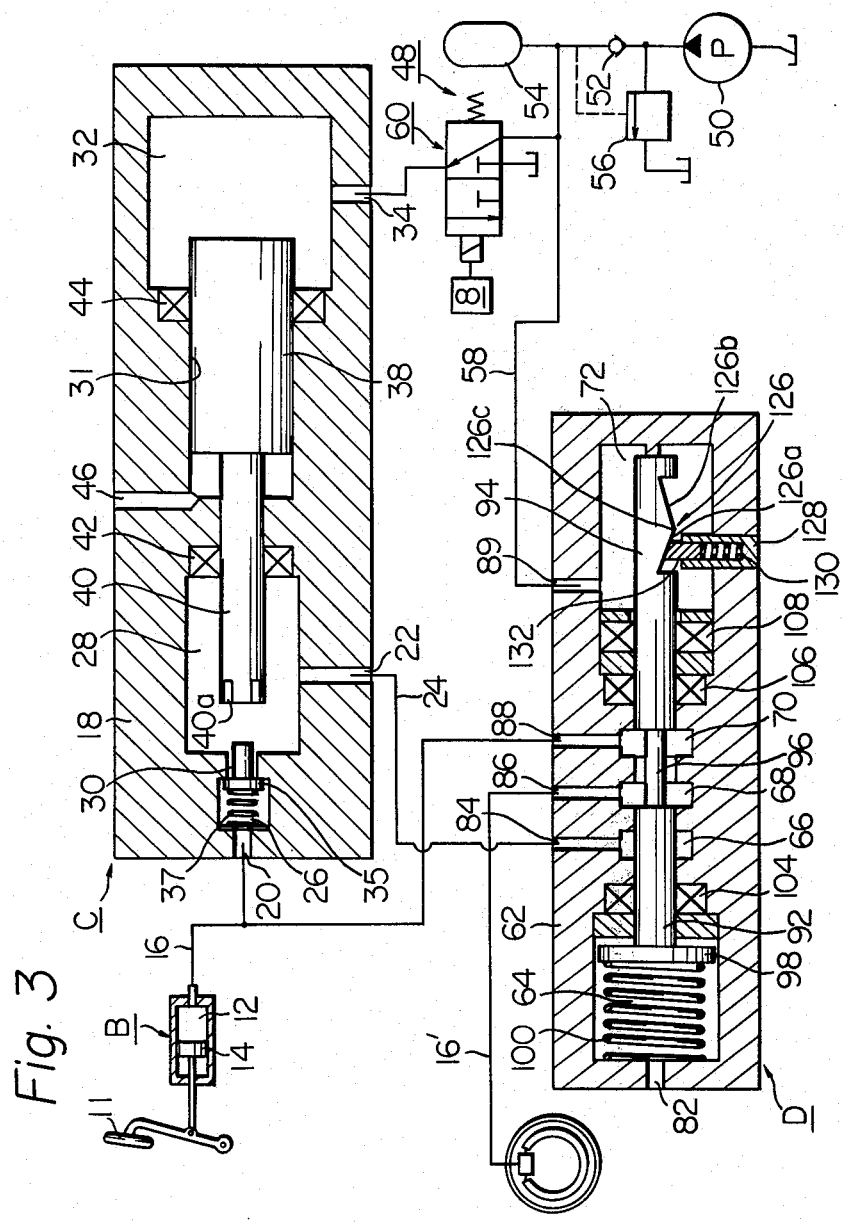
FIG. 3 is a view similar to FIG. 1 but shows another modified form of the device shown in FIG. 1.

Another modified form of an anti-skid brake control device of the present invention is shown in FIG. 3, in which like or corresponding component parts are designated by the same reference numerals as those used in FIG. 1. This modified form of an anti-skid control device differs from that of FIG. 1 in the construction of the bypass valve D, and a detailed description is given of the bypass valve D only for the sake of simplicity. In this modification, the second large diameter portion 94 of the valve spool 90 of the bypass valve D is formed with a tapered cam surface 126 having first and second cam lobes 126a and 126b. The casing 62 has a bore 128 in which a guide sleeve 130 extending into the fifth fluid chamber 72 is tightly fitted. A movable biased cam following 132 is slidably disposed in the guide sleeve 130 and biased by a compression spring 134 disposed in the guide sleeve 130 into engagement with the tapered cam surface 126. This construcion is advantageous in that the cam follower 132 acclerates the axial rightward or leftward movement of the valve spool 90 from a predetermined central position at which the cam follower 132 contacts a junction 126c of the lobes 126a and 126b, thereby reducing the period time required for the changeover operation of the bypass valve D, especially in response to failure of the power unit 48.

Figure 4:
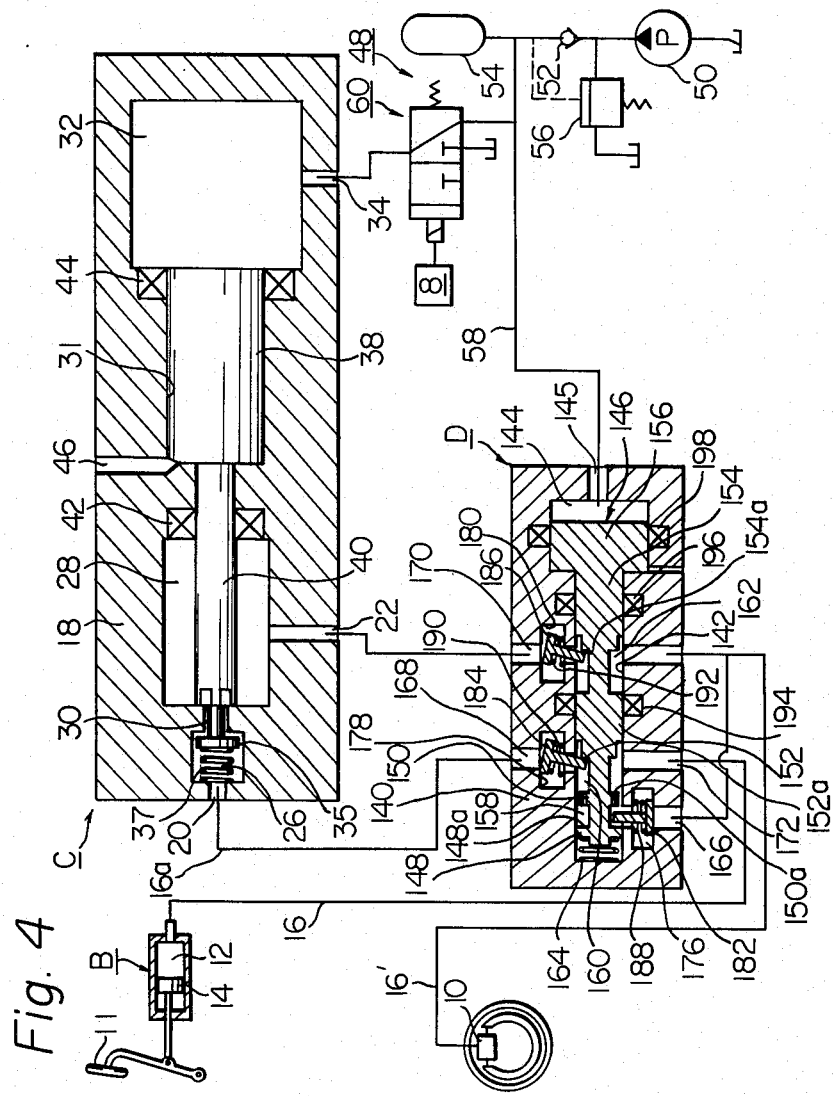
FIG. 4 is a view similar to FIG. 1 but shows still another modified form of the device shown in FIG. 1.
Figure 4:
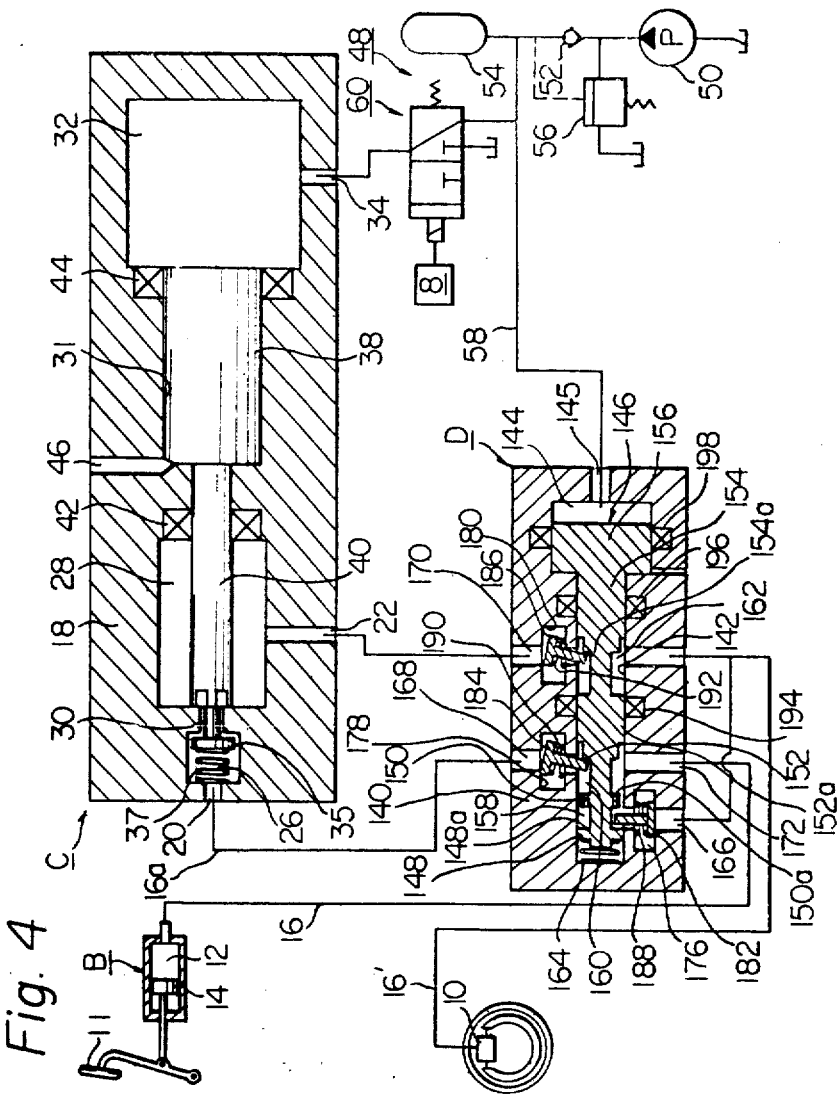

A further modified form of an anti-skid brake control device is illustrated in FIG. 4, in which like or corresponding component parts are designated by the same reference numerals as those used in FIG. 1. In this modification, the bypass valve D comprises a casing 140 having formed therein first and second fluid chambers 142 and 144. The second fluid chamber 144 has a port 145 communicating with the hydraulic line 58 leading to the power unit 48. A slidable valve spool 146 is axially movably disposed in the first and second fluid chambers 142 and 144. This valve spool 146 has first, second, third, fourth and fifth lands 148, 150, 152, 154 and 156, the fifth land 156 being received in the second fluid chamber 144 while the others are received in the first fluid chamber 142. The lands 148 and 150 define therebetween a first confinement 158. The lands 150 and 152 define therebetween a second confinement 160 and the lands 152 and 154 define therebetween a third confinement 162. As shown, the land 150 has at least one axially extending flow passage 150a formed therethrough, which provides fluid communication between the first and second confinements 158 and 160. A biasing means such as a compression spring 164 is disposed in the first fluid chamber 142 to urge the valve spool 146 rightward as shown in FIG. 4.

The casing 140 also has formed therein a radially extending flow passage 166, a second outlet 168 nd a second inlet 170 which are in fluid communication with the first, second and third confinements 158, 160 and 162, respectively. The casing 140 is further formed with a first inlet 172 and a first outlet 174, which are radially aligned with the second outlet 168 and the second inlet 170 respectively. The passage 166 communicates with the brake cylinders 10 through the hydraulic line 16', with which the first outlet 174 also communicates. The second outlet 168 communicates with the inlet 20 of the modulator valve C through a hydraulic line 169, while the second 170 communicates with the outlet 22 of the modulator valve C. The first inlet 172 communicates through the hydraulic line 16 with the master cylinder B to receive hydraulic brake fluid under pressure therefrom. The passage 166, second outlet 168 and second inlet 170 are provided with first, second and third valve chambers 176, 178 and 180, respectively, which receive therein first, second and third valve elements, here shown as tilting valves 182, 184 and 186, respectively. The first tilting valve 182 has a valve head (not numbered) which is biased by a compression spring 188 in a direction to block the flow passage 166. This tilting valve 182 has a cylindrical valve stem (not numbered) extending into the first confinement 158 which is engageable with a shoulder 148a of the first land 148 of the valve spool 146 when the spool 146 moves rightward. The first tilting valve 182 is thereby tilted against the force of the compression spring 188 to open the flow passage 166. Likewise, the second tilting valve 184 has a valve head (not numbered) which is biased by a compression spring 190 in a direction to block the second outlet 168. The second tilting valve 184 has a cylindrical valve stem (not numbered) which extends into the second confinement 160 and is engageable with a shoulder 152a of the land 152 when the valve spool 146 is moved leftward, or to the position shown in FIG. 4, thereby causing the valve 184 to unblock the second outlet 168. Similarly, the third tilting valve 186 has a valve head (not numbered) which is biased by a compression spring 192 in a direction to block the second inlet 170. The third tilting valve 186 has a cylindrical valve stem (not numbered) which extends into the third confinement 162 and which is engageable with a shoulder 154a of the land 154 to unblock the second inlet 170 when the valve spool 146 is moved leftward as shown in FIG. 4. Indicated as 194, 196 and 198 are seals to prevent oil leakage.

During normal operation of the vehicle in which the skid signal is not generated, fluid is fed into the working chamber 32 of the modulator valve C and the second fluid chamber 144 of the bypass valve D from the power unit 48. Consequently, the piston 38 of the modulator valve C and the valve spool 146 of the bypass valve D assume the positions shown in FIG. 4. In this situation, the second and third tilting valves 184 and 186 are tilted by the shoulders 152a and 154a, respectively, so that the second outlet 168 and second inlet 170 are unblocked. When the brake pedal 11 is depressed, hydraulic brake fluid under pressure is fed from the master cylinder B into the first inlet 172. Hydraulic brake fluid under pressure flows from the first inlet 172 through the second confinement 160, the second outlet 168 and the inlet 20 into first chamber 26 of the modulator valve C. Since the valve 35 is not blocking the passageway 30, fluid flows from the first chamber 26 into the second chamber 28, from which it is fed through the outlet 22 into the second inlet 170 of the bypass valve D. As previously described, since the second inlet 170 is not blocked by the third tilting valve 186, fluid from the second inlet 170 passes through the third confinement 162, the first outlet 174 and the hydraulic line 16′ into the brake cylinders 10.

When the angular deceleration of the wheel exceeds the predetermined value, the sensor 8 generates the skid signal which causes the control valve 60 to close and drain fluid from the working chamber 32 of the modulator valve C. Accordingly, the piston 38 is moved rightward so that the valve 35 closes the axial passageway 30. Since the volume of the second chamber 28 of the modulator valve C is increased due to rightward movement of the plunger portion 40, fluid is partially drained from the brake cylinders 10. Thus, locking of the wheels is prevented, and skidding of the vehicle is eliminated as already described.

If the power unit 48 fails, hydraulic fluid under pressure is not fed into the second fluid chamber 144, so that the valve spool 146 is moved rightward as shown in FIG. 4 by the force of the compression spring 164. In this situation, the shoulder 148a of the first land 148 of the valve spool 146 engages with the cylindrical valve stem of the first tilting valve 182, thereby tilting the same so that the flow passage 166 is opened. Accordingly, fluid fed into the first inlet 172 flows through the axially extending flow passage 150a formed through the second land 150 into the flow passage 166, from which it is fed through the hydraulic line 16′ into the brake cylinders 10. It will be understood that the second and third tilting valves 184 and 186 block the second outlet 168 and second inlet 170, respectively. Thus, hydraulic brake fluid under pressure in the second and third confinements 160 and 162 is not fed to the modulator valve C. It will thus be seen that hydraulic brake fluid under pressure is supplied to the brake cylinders 10 even if the power unit 48 fails, and sufficient braking force is available.

What is claimed is:

1. An anti-skid device for a braking system of a vehicle having a manually actuable master cylinder, a brake cylinder communicable with the master cylinder and operative to apply braking force to a vehicle brake assembly in response to fluid fed thereinto under pressure from the master cylinder, a source of fluid pressure, and a sensor responsive to a selected vehicle operating parameter and operative to generate an electrical skid signal when level of the parameter is above a predetermined value indicating that the vehicle is in a skid condition; said anti-skid control device comprising:
   a modulator valve disposed between the master cylinder and the brake cylinder and being communicable with the source of fluid under pressure;
   a control valve disposed between the source and said modulator valve and being normally open to allow fluid communication therebetween;
   said control valve being operative to close and thereby block fluid communication between the source and said modulator valve and fluid under substantially atmospheric pressure in response to the skid signal;
   said modulator valve being operative to allow fluid flow therethrough when said control valve is open, and to block fluid flow therethrough and partially drain fluid from the brake cylinder to reduce the braking force applied by the brake cylinder to the brake assembly when said control valve is closed;
   a bypass valve communicating with the source and being operative to allow fluid flow between the master cylinder and the brake cylinder through said modulator valve when the pressure of fluid in the source is above a predetermined level, and to block fluid flow through said modulator valve and provide a bypass fluid flow path around said modulator valve when the pressure of fluid in the source is below said predetermined level;
   and an emergency control device including switch means for producing an electric actuation signal when the pressure of fluid in the source is below a predetermined level and a module connected to said switch means and said control valve for actuating said control valve so as to hold said piston at said position of maximum extension when it receives said actuation signal.

2. A device as claimd in claim 1, in which said modulator valve includes:
   a firt chamber communicating with the master cylinder;
   a second chamber communicable with the brake cylinder;
   an axial passageway formed between said first and second chambers;
   a normally closed shut-off valve disposed in said passageway; and
   a piston having one end communicable with the source and other end extending into said second chamber; said piston being engageable with said shut-off value;
   said piston being operative to move to a position of maximum extension into said second chamber and engage with and open said shut-off valve to allow fluid to flow through said passageway when fluid under pressure is applied to said end thereof from the source, and to move to a position of minimum extension into said second chamber and disengage from said shut-off valve to allow said shut-off valve to close and block fluid flow through said passageway when application of fluid under pressure is terminated;
   said piston by moving from said position of maximum extension to said position of minimum extension thereby reducing the effective volume of said second chamber and partially draining fluid from the brake cylinder.

3. A device as claimed in claim 2, in which said bypass valve includes:
   a first inlet communicating with the master cylinder;
   a second inlet communicating with said second chamber of said modulator valve;
   an outlet communicating with the brake cylinder; and
   a valve spool operative to selectively provide fluid communication between said outlet and said first and second inlets and having one end thereof communicating with the source;

said valve spool providing fluid communication between said second inlet and said outlet when the pressure of fluid in the source is above said predetermined level, and providing fluid communication between said first inlet and said outlet when the pressure of fluid in the source is below said predetermined level.

4. A device as claimed in claim 3, in which said bypass valve further includes a biased cam follower engaging with a cam surface of said valve spool to apply a force to said valve spool to urge the same away from a predetermined position.

5. A device as claimed in claim 2, in which said bypass valve includes:
- a first inlet communicating with the master cylinder;
- a second inlet communicating with said second chamber of said modulator valve;
- a first outlet communicating with the brake cylinder;
- a second outlet communicating with said first chamber of said modulator valve;
- a first valve element disposed between said first inlet and said first outlet and being biased to block fluid communication therebetween;
- a second valve element disposed between said first inlet and said second outlet and being biased to block fluid communication therebetween;
- a third valve element disposed between said second inlet and said first outlet and being biased to block fluid communication therebetween; and
- a valve spool communicating with the source and being engageable with said first, second and third valve elements;

said valve spool being operative to move said second and third valve elements to positions to allow fluid communication between said first inlet and said second outlet and between said second inlet and said first outlet respectively when the pressure of fluid in the source is above said predetermined level, and to move said first valve element to a position to allow fluid communication between said first inlet and said first outlet when the pressure of fluid in the source is below said predetermined level.

6. An anti-skid device as claimed in claim 1, in which said switch means includes a mechanical switch with a movable rod mechanically connected with said valve spool, said mechanical switch being actuated to close or open in accordance with the movement of said movable rod.

* * * * *

UNITED STATES PATENT OFFICE
CERTIFICATE OF CORRECTION

Patent No. 3,877,759         Dated April 15, 1975

Inventor(s) Tomoyoshi Sekiguchi et al.           Page 1 of 2

It is certified that error appears in the above-identified patent and that said Letters Patent are hereby corrected as shown below:

In The Drawings:

Figure 4 should be omitted and the figure shown on the attached sheet substituted therefor, but will apply to the Letters Patent only.